United States Patent [19]
Fowler et al.

[11] Patent Number: 5,430,717
[45] Date of Patent: Jul. 4, 1995

US005430717A

[54] DIGITAL ELECTRONIC LOOP CROSSCONNECT AND CARRIER SYSTEM

[75] Inventors: Charles J. Fowler, Sinking Spring; Kenneth A. Orr, Wernersville; Larry Grandstaff, Mohrsville, all of Pa.

[73] Assignee: Krone AG, Berlin-Zehlendorf, Germany

[21] Appl. No.: 172,557

[22] Filed: Dec. 23, 1993

[51] Int. Cl.6 .................................................. H04J 3/12
[52] U.S. Cl. ................................ 370/58.2; 370/68.1; 370/110.1
[58] Field of Search .................. 370/58.1, 58.2, 58.3, 370/66, 67, 68, 68.1, 110.1

[56] References Cited

U.S. PATENT DOCUMENTS 5,268,903 12/1993 Jones et al. ................ 370/68.1 X

FOREIGN PATENT DOCUMENTS

2848255C2 12/1989 Germany .

Primary Examiner—Melvin Marcelo
Attorney, Agent, or Firm—McGlew & Tuttle

[57] ABSTRACT

A digital cross connect device for telephone and data transfer systems includes a plurality of line cards, including line cards connected to a network line and line cards connected to a subscriber line. The network line and the subscriber line carry a signal including a data portion and a status signal portion. Signal separation is provided for separating the data portion from the status signal portion. A coder is provided for coding the status signals to provide status signal bit packets based on received status signals. A status signal time slot interchange is provided for receiving the status signal bit packets and transmitting the status signal bit packets, based on assigned time slots, to another line card. The status signal time slot interchange includes a connection memory having address locations corresponding to time slots, and a dual port memory for receiving the status signal bit packets and writing bit packets based on the address locations of the connection memory.

6 Claims, 8 Drawing Sheets

DIGITAL ELECTRONIC LOOP CROSSCONNECT AND CARRIER SYSTEM

CROSS REFERENCE TO RELATED APPLICATION

This application relates to application Ser. No. 08/172,558, filed Dec. 23, 1993.

1. Field of the Invention

The present invention relates generally to a intelligent, digital electronic cross-connect device for remotely configuring and managing local telephone systems and more particularly to a switching system providing flexibility for a variety of different telephony tasks.

2. Background of the Invention

Transport systems carry information between a central office and telephone subscribers. The information includes subscriber loop idle/busy status and voice or data originating from or transmitted to various subscribers. Communications lines generally extend from the central office to a feeder distribution interface (FDI) which is sometimes called a cross-connect device. In prior art devices, this cross-connect device provided a metallic connection of lines from the central office feed cable to the subscriber. At the subscriber's request or upon a service order from the central office, changes to the connection in the cross-connect device, typically at a remote location distant from the central office, must physically change the hard wire connections in the device. Hence, it is relatively labor intensive to accomplish any change in electrical connection between a subscriber and the feeder cable pair in the current versions of the cross-connect device.

U.S. Pat. No. 4,520,234, to Fields et al. discloses a remote cable switching system utilizing a logic array and a switch matrix having a record of the present matrix state of the switch subsystem. The switch matrix module is a plurality of relays. U.S. Pat. No. 4,539,564, to Smithson discloses a central matrix formed of a multiplicity of solid state analog switches. U.S. Pat. No. 4,525,605, to Wever et al. also discloses a system utilizing relays to access telephony lines.

U.S. Pat. No. 3,562,435, to Joel, Jr. discloses a switching system with an automated main distributing frame. The system includes a permutation storage and network control circuit for controlling a switching network interposed between telephone lines. The switching network uses relays.

SUMMARY AND OBJECTS OF THE INVENTION

It is an object of the invention to provide a digital electronic loop crossconnect & carrier system which is flexible and allows pair-to-pair crossconnect (FDI replacement) and additionally provides a basis for other applications such as special services loop facilities interface, pair gain for telephone equipment, loop extension, special services, trunk facilities transport, (integrated network access, INA) and fiber-in the loop (FITL) applications wherein such functionalities are integrated in a single unit which can be reconfigured as needed.

According to the invention, a cross connect device is provided for cross connection of voice circuits between incoming and outgoing ports such as a port connected to a subscriber and a port connected to a central office. Each port of a subscriber is connected to a line card or subscriber interface module (SIM) located on a line card drawer of a cross connect device. Likewise, ports connected to the central office are provided in another line card or network interface module (NIM) also located on a line card drawer of the cross connect device. The line cards (hybrids) convert analog signals to digital signals which are processed by the cross connect device. Additionally, digital interface ports (T-1) may be provided (preferably with four port digital line cards) providing connection to a data communication line that carries digital compressed signals.

The line cards are connected to a Voice Frequency Time Slot Interchange unit for coupling network voice frequency signals to subscriber voice frequency signals (and vice versa). The Signaling Time Slot Interchange unit is also provided for connecting loop signalling data from network line cards to subscriber line cards (and vice versa).

The signalling time slot interchange (TSI) includes one or more dual port memories (random access memory—RAM) controlled via a sequential counter. After all of the time slots have been loaded, incoming signalling data is replaced with a look-up table value which is then written as the new signalling data (coded for the outgoing line) in an address table (data grooming). The microprocessor can also write the data directly to the outgoing address (no data grooming). The data leaves the look-up table and is stored in an address table before going to the outgoing line card.

According to a further aspect of the invention, a hardware interrupt circuit is added to the look-up tables to notify the microprocessor when an illegal packet of data has been received by the look-up tables. Since the incoming data is signalling data (representing the status of a line such as a subscriber line), the hardware interrupt circuit provides a mechanism for detecting errors. Software can make use of this error detection scheme by loading the upper two bits of a valid data address with ones and loading an invalid data address with a zero in either position. If the "zero" is loaded with the highest location (a high level interrupt will be triggered. If the "zero" is loaded into the next highest location, a low level interrupt will be triggered. The interrupt circuit may be disabled for each cross connection wherein the high level interrupt can be masked after an interrupt has occurred to enable recognition of a return to normal interrupt state (for example if a line card is removed and replaced).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
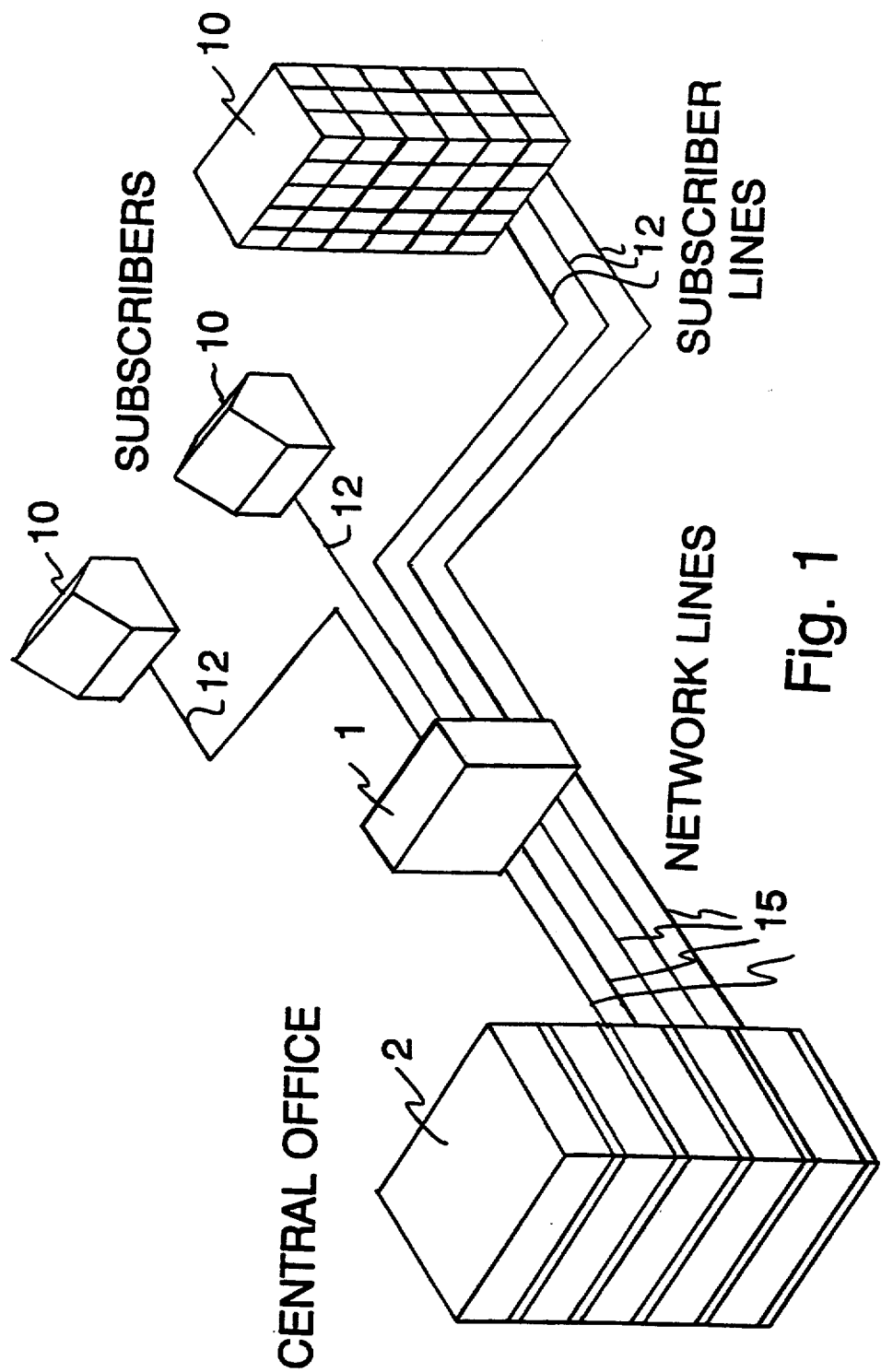
FIG. 1 is schematic view showing use of the cross connect device between subscriber lines and network lines, connecting subscribers and a central office.

Referring to the drawings in particular, the invention comprises a system for providing basic loop crossconnect functions and also providing a basic switching system for use in various applications including pair-to-pair crossconnect (to replace a feeder distribution interface) and additionally provides the basis for other applications including a special services loop facilities interface, pair gain for plain ordinary telephone systems (POTS), loop extension, special services trunk facilities transport (integrated network access, INA) and fiber in the loop (FITL) applications.

The invention is based on a centralized processing architecture which physically may be employed as shown in FIG. 1. The invention comprises a cross connect system 1 for switching and monitoring signalling over individual network lines 15 and subscriber lines 12. According to the invention, a subscriber line 12 is provided and connected with a subscriber 10 and a line card 20. The powering of the line and monitoring of the loop current takes place through the line card 20. The signal from the subscriber 10 or the central office 2, if the line card 20 is connected to network lines 15, is separated in the line card 20. The data portion, usually voice, is sent to an analog to digital convertor 40 and the status signals are separated and sent to a coder/decoder 41 (see FIG. 2). The coder 41 converts status signals into 8-bit packets or bytes at 8 kHz. Preferably each different status signal has its own bit address and the data in that bit address indicates whether or not that status signal is present. The 8-bit packets or bytes may be passed to an integrator 50 for conditioning. The integrator 50 integrates or averages the status signals to remove noise spikes which would otherwise appear as false traffic. The integration or averaging can be over a constantly moving window or the status signals can be integrated or averaged down to a slower rate. The integration eliminates misinterpretation of the line signals during later processing. Accordingly, by this processing, the signals from the line card 20 are converted into event messages which are passed to a call processor having state machines for each of the various lines.

The 8-bit packets or bytes are fed from the line card 20 to a signalling TSI (Time Slot Interchange unit 102). The signalling TSI redirects the incoming status signals to the proper outgoing line at the proper time slot. This redirecting is done under commands from the central office 2 over dedicated lines.

Figure 2:
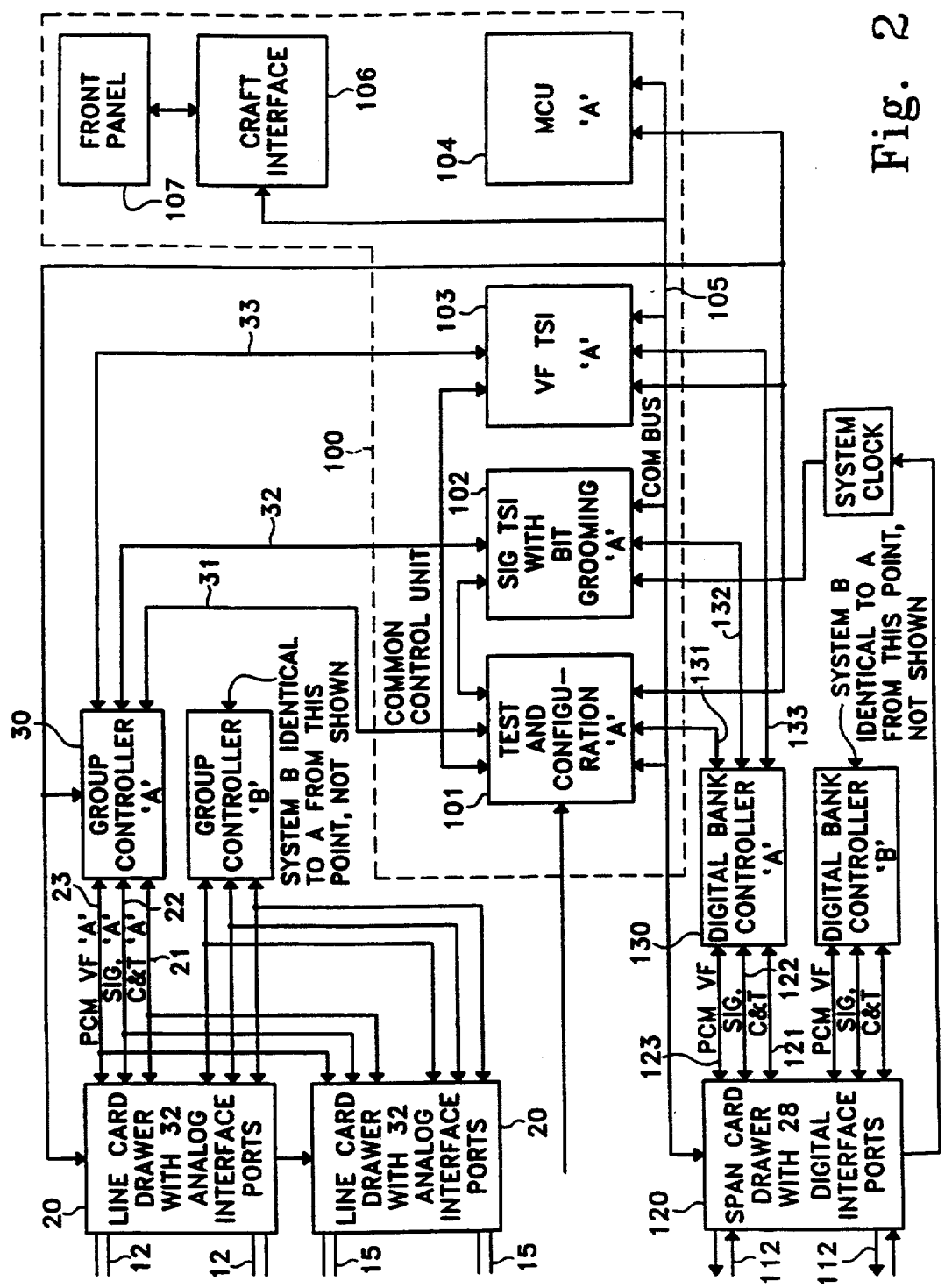
FIG. 2 is a diagram showing the system communication bus architecture according to the invention.
Figure 3:
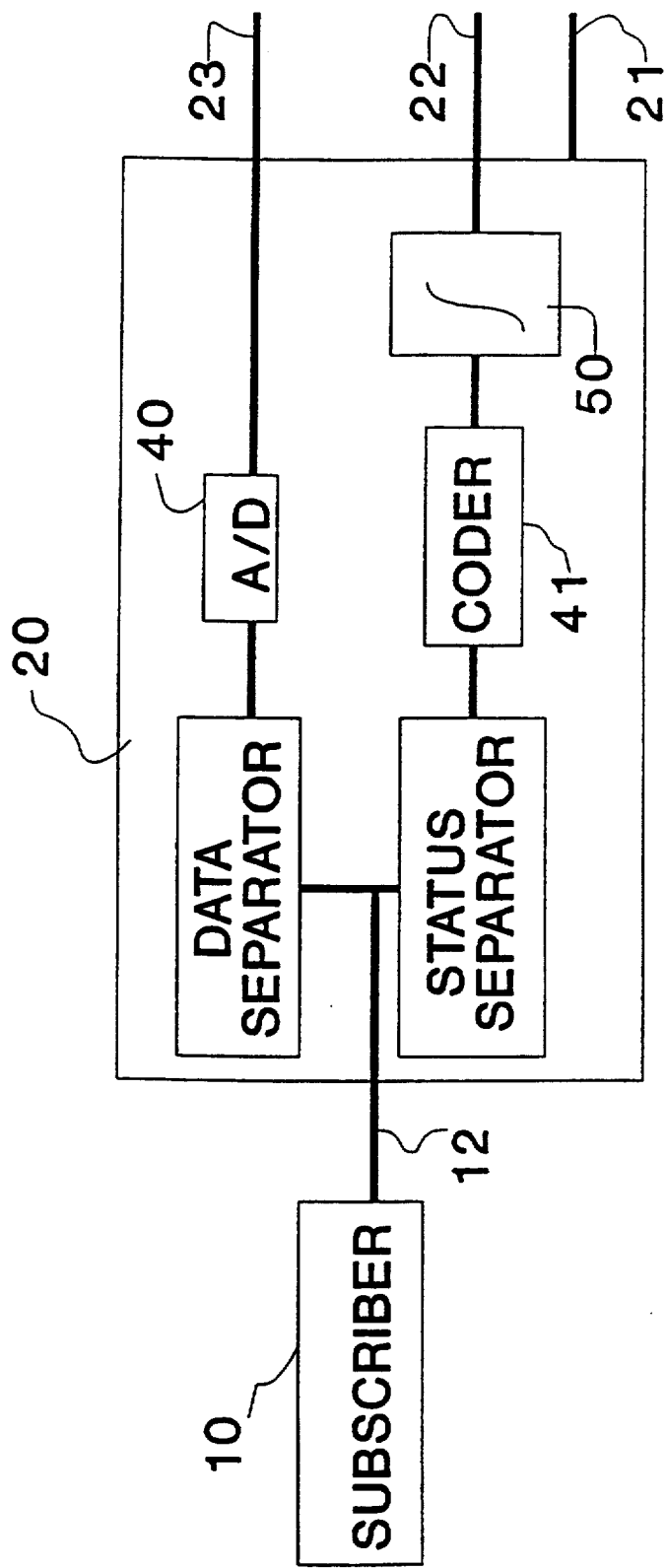
FIG. 3 is a block diagram showing the connections through the line card to the signal time slot interchange.

FIG. 2 shows the system architecture including communication channels connecting line cards 20 and the main control unit 104.

The system is based on centralized processing facilitated by system control modules located in a common point, namely the common control unit 100. All secondary processors not located in the common control unit 100 are subordinate and controlled by several internal communication buses which are also shown in FIG. 2.

The voice processing is performed at the Voice Frequency (VF) Time Slot Interchange (TSI) unit 103. This processing is non-intrusive and will provide a cross-connection of voice circuits between ports. A test pattern can be injected and extracted from a voice PCM (pulse code modulation) stream for loop-back test capability.

Figure 6:
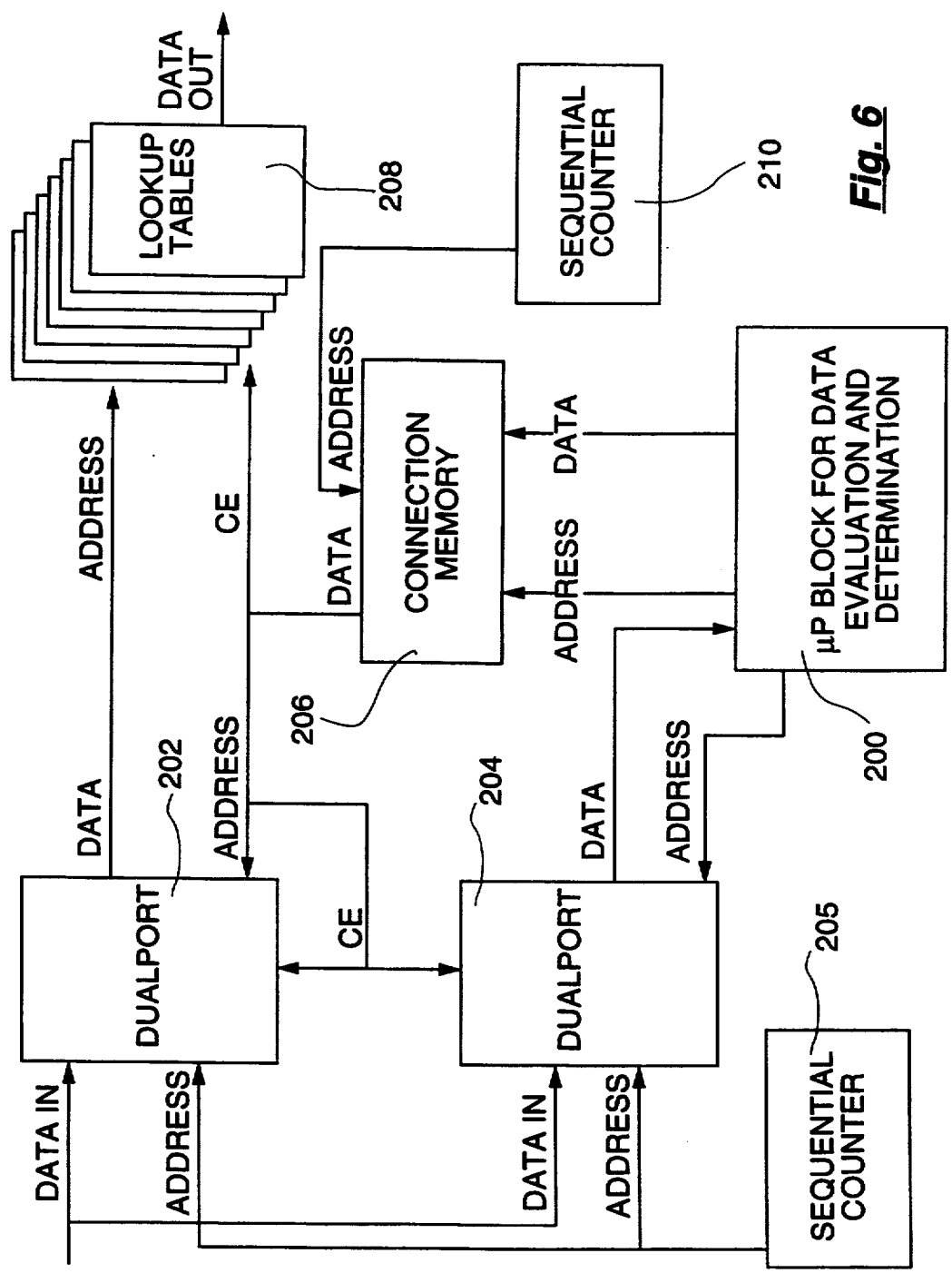
FIG. 6 is a block diagram showing components of the time slot interchange unit.

The line circuit signaling is interrogated and operated through the local processor 200 on the signaling TSI 102 (see FIG. 6). The line circuit condition is observed via NIM and SIM status registers. A bit packing scheme is implemented which allows observation and polling of the status registers in the signaling TSI by the TSI local processor. The SIM status register will show the state of the switch-hook, and the presence of Ring Ground. The NIM status register will show Forward and Reverse Loop Detect, presence of Tip or Ring Ground, and presence of Ringing.

FIG. 2 shows the communication architecture of the system of the invention including communication bus 105. Communication bus 105 connects to the master control unit 104, the digital group controller 130, the VF TSI unit 103, the signaling TSI unit 102 and the craft interface 106 (with access at a front panel 107).

The system is preferably implemented with complete redundancy through a redundant module with bus structure identical to that described above (two separate systems A & B).

The communication bus 105 is the most time critical and is the backbone communication in the common control unit 100. This bus 105 is implemented as an Ethernet network configured in a Hub configuration. This bus 105 is duplicated for both the A and B systems of the common control unit. Ethernet may be used as a Logical pipe, datagram or broadcast mode bus. Communication bus 105 is preferably accessible to the Digital Bank Controllers (DBCs) 130 in the DS1 Bank.

The use of the communication bus 105 and an identical bus system, wherein to be two (2) discrete Ethernet hubs are provided, assures that the A and B sides of the common control unit are truly independent, and via the hardware can not impose communication problems on each other.

The test and configuration modules 101 transmit and receive Non-Real-Time information from the line cards 20.

The C and T (configure and test) connection interface is one (1) 2 Mb/s control/interface provided to each Line card 20. The C & T interface is parsed on the group controller module 30 and redistributed into seven (7) individual 2 Mb/s interfaces. These seven (7) channels are distributed to the Line cards. The C & T channels 21 and 31 are used to write configuration information (Control Register A) to the individual Line Cards (hybrids). The C & T Channels 21 and 31 are where Transmit and Receive filter Gain and Loss is controlled as to the coder 41. This is also where the CODEC operating modes are specified which are: Normal, Digital Loopback, Analog Loopback and Power Down.

The signal Channel 32, as with the C & T Channel 31, is routed to the Line Shelf Assembly (LSA) module 20. This channel 32 is demultiplexed at group controller 30 and redistributed as seven (7) individual 2 Mb channels 22, one (1) each to the Line cards 20. The signal Channel Read function will provide the MCU 104 with signature information about the Line cards (Hybrids), fuse blown indication and group controller 30 A or B Active indication.

The system of the invention preferably supports a total of 18 line shelves 4,032 ports. The maximum requirement is for a fully configured cross-connect where 2016 NIMs (Network Interface Modules) and 2016 SIMs (Subscriber Interface Modules) are supported.

Figure 4:
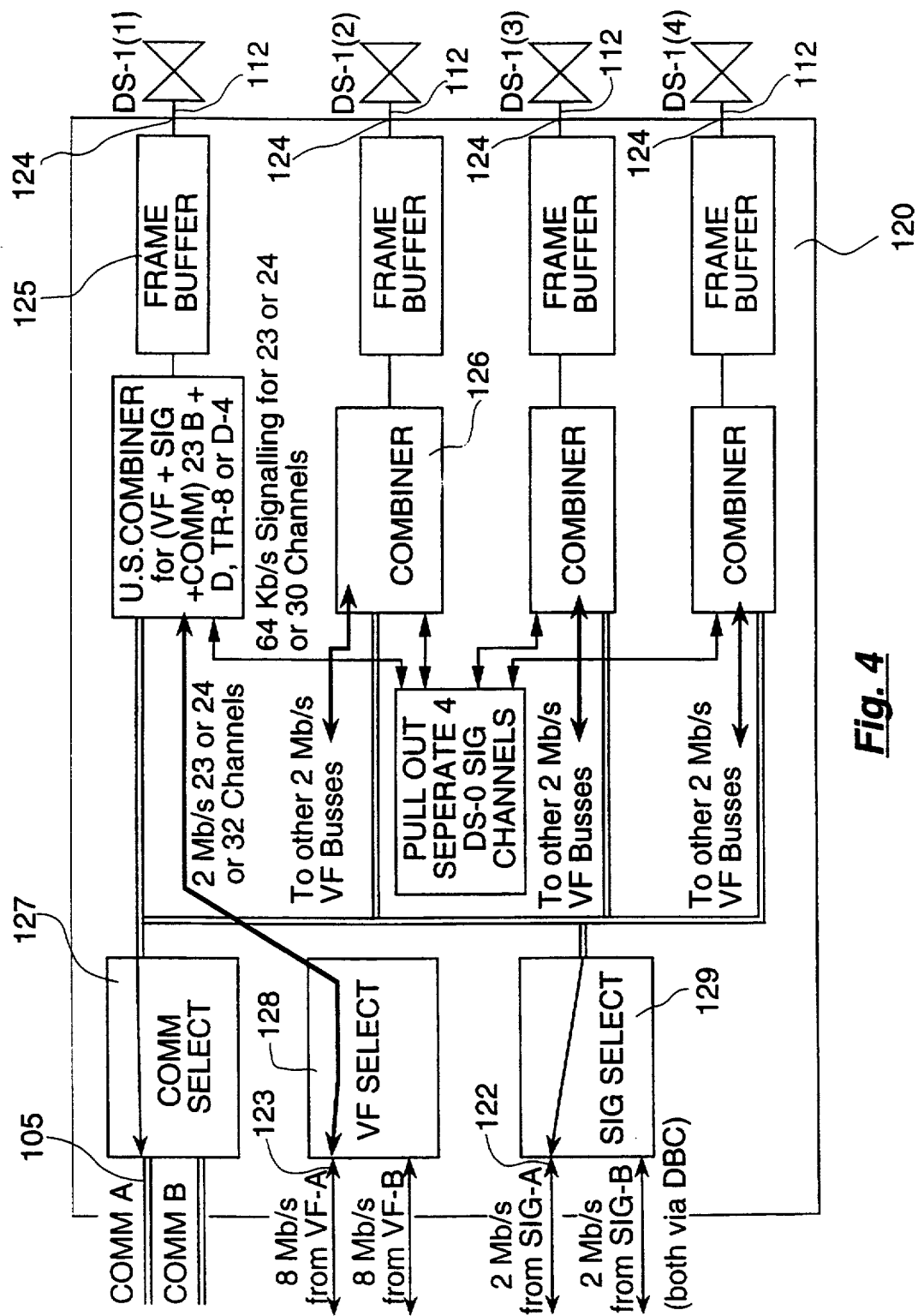
FIG. 4 is a block diagram showing a digital interface card for data communication lines carrying digitally compressed signals.

FIG. 4 shows a quad DS1 module 120. The DS1 module is a digital line card with digital ports connected to digital lines 112. The digital lines carry digitally compressed data signals at a DS1 rate (1.544 Mb/sec). As seen in FIG. 4, the digital module 120 has four ports 122 for each of the DS1 lines 1 through 4. Each port is connected to a combiner 126 via a frame buffer 125. The combiner combines outgoing voice frequency and signalling data from the cross connect and separates incoming voice frequency and signalling data for input to the cross connect device 1. Communication signals may also be separated or combined at the combiner 126. The voice frequency signals are directed by the voice frequency select unit 125 over the PCM VF (pulse code modulated voice frequency) bus 123. The communication signals are directed through the communication select 127 (for selecting system A or B, which ever is active) and directed over the communication bus 105. The signalling data is sent out over signal bus 122. A configuration and test bus 131 (see FIG. 2) is also provided in the manner similar to the configuration and test bus 21 described above. The signal select unit 129 and the Voice Frequency select unit 128 selects either the system A or the system B depending on which is active.

Figure 5:
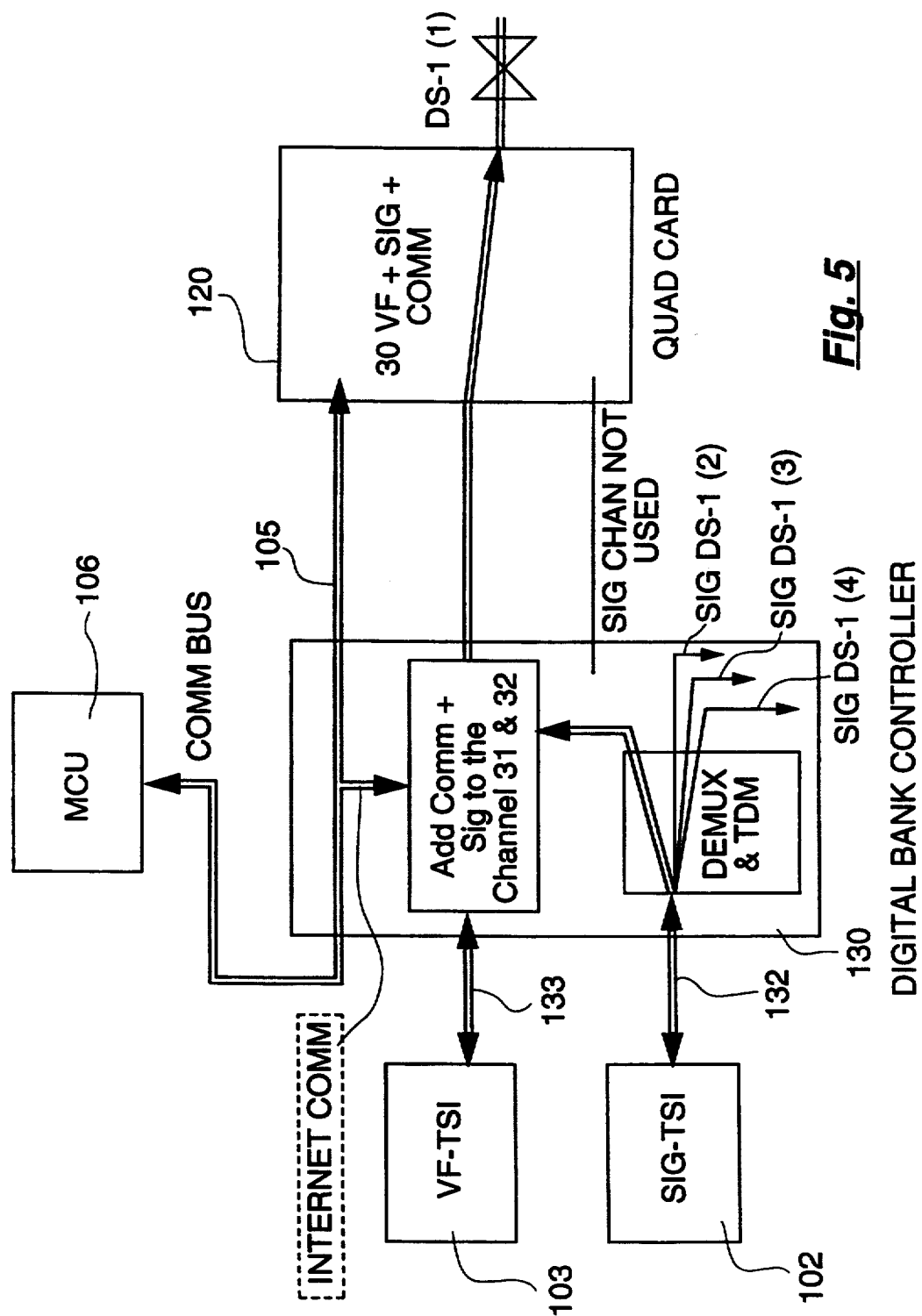
FIG. 5 is a block diagram showing the connection to the digital group controller.

FIG. 5 shows the digital bank controller 130 which receives signals to and from the digital line cards 120 and passes them to and from either VF TSI 103 or the signal TSI unit 102. The signals from (to) the line cards may be multiplexed (demultiplexed) for transfer to the signal TSI unit 102, over signal bus 132. Voice frequency signals are connected to the VF-TSI unit 103 over bus 133 with a configuration and test bus 131 connecting the digital bank controller 130 to the test and configuration module 101.

FIG. 6 shows the organization of the signal TSI unit 102. The TSI unit 102 is a full access TSI wherein signal data from network lines as well as from subscriber lines are fed into the TSI unit 102 and signal data to network lines as well as to subscriber lines is output from TSI unit 102. This allows for flexibility including the possibility of connection from network line to network line.

The TSI unit 102 includes the microprocessor 200. The microprocessor 200 is connected to the central office via a dedicated line (such as a dedicated time slot). The central office then controls the microprocessor 200 via a software based network manager for determining time slots for signalling data and other data (voice frequency data).

The 8 bit packets or bytes received from the line cards may be conditioned in a bit packing process wherein status changes in the various lines may be monitored and reported to the central office and the subscriber. This bit packing and other signal conditioning is described more fully in the U.S. application entitled Cross Connect Device Signal Processing (filed concurrently herewith), assigned to the same assignee of the presented invention which is hereby incorporated by reference.

Signalling data from the line cards 20 arrives to the TSI unit 102 via the 8 Mb/sec bus 32 as described above. The data is demultiplexed to a data rate of 2 Mb/sec and then handed to a serial to parallel converter. The data leaves the serial to parallel converter as 8 bit wide parallel packs at a 16 MHz rate. The data is then loaded into both of the dual port memories (RAMs), namely the upper dual port RAM 202 and the lower dual port RAM 204 sequentially via sequential counter 205.

The lower path shown in FIG. 1 is used by software for event recognition. This dual port is bank switched and the data is off loaded in bit packs into a another dual port for reading by the microprocessor. Bit packs are arranged in memory locations wherein a bitpacker reads out the least significant bit and then the next least significant bit etc. The bit packing is performed for all bits and is bank switched after each of 2,048 time slots have been loaded. The microprocessor may than be used for event recognition using software which may output new signalling data for the outgoing line card via the connection memory 206 and the look-up tables 208.

According to an advantageous feature of the invention, the microprocessor may be used in a more limited fashion or a comparison may be made based on the output of the software system noted immediately above and data output via a further time slot exchange system as follows.

The incoming data (network signaling data and subscriber signaling data) may be routed via the upper path shown in FIG. 6 to the dual port memory 202. The dual port memory 202 preferably has two banks allowing it to be written to and read without contention problems. The microprocessor (under the direction of the central office) establishes time slots wherein the address of data in the dual port memory 202 is stored in connection memory 206 corresponding to the established time slots. A sequential counter 210 sequentially increments the connection memory 206 whereby connection data is read from the dual port 202 based on the connection map address in time. This data then becomes part of an address along with higher bits from the connection map 206.

The connection data and higher bits may then be changed to a network or subscriber outgoing line card code (data grooming) if needed. This is done by using look up tables 208 which provides a map for corresponding new data 212 (see FIG. 7) for data read out of the connection memory. The new data corresponds to a signal data for an outgoing line card and the data read out of the connection memory corresponds to data from an incoming line card.

Figure 7:
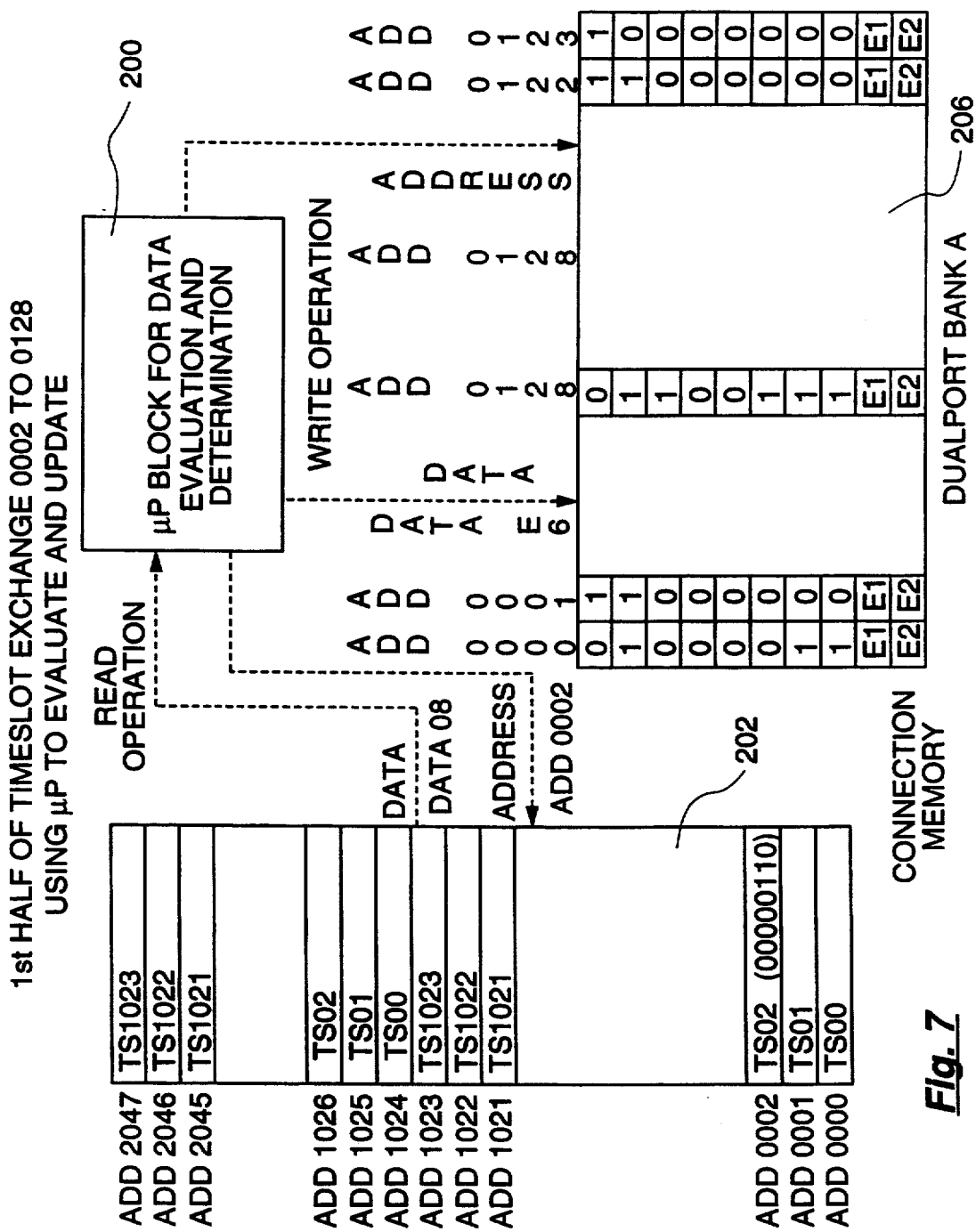
FIG. 7 is a diagram explaining a first half of a time slot exchange.

As shown in FIG. 7, the dual port memory 204 receives data based on the address of the line card. The dual port memory 204 also preferably has two banks wherein one bank is written to while the other bank writes to avoid contention. The data is written to one side (left) of the dual port memory 204 (with line card 20 signal data) and read at the same location in the memory, in a different bank, (such as data at ADD 0002) at the microprocessor 200. The microprocessor 200 may be used to evaluate data and update or force signal data when a problem is detected.

For example, if a ring signal is present on a subscriber line due to some error or malfunction (the phone rings but no call is present), new signal data can be forced to avoid the problem (ring with no call) while the problem is investigated. The microprocessor 200 writes new data to an address location of the connection memory (dual port) 206. The address location is determined by the central office and provides the time slot for outgoing data. For example, data from ADD 0002 is evaluated and new data is written to ADD 0128 of connection memory 206, representing an address in time with a corresponding data code to be transmitted.

Figure 8:
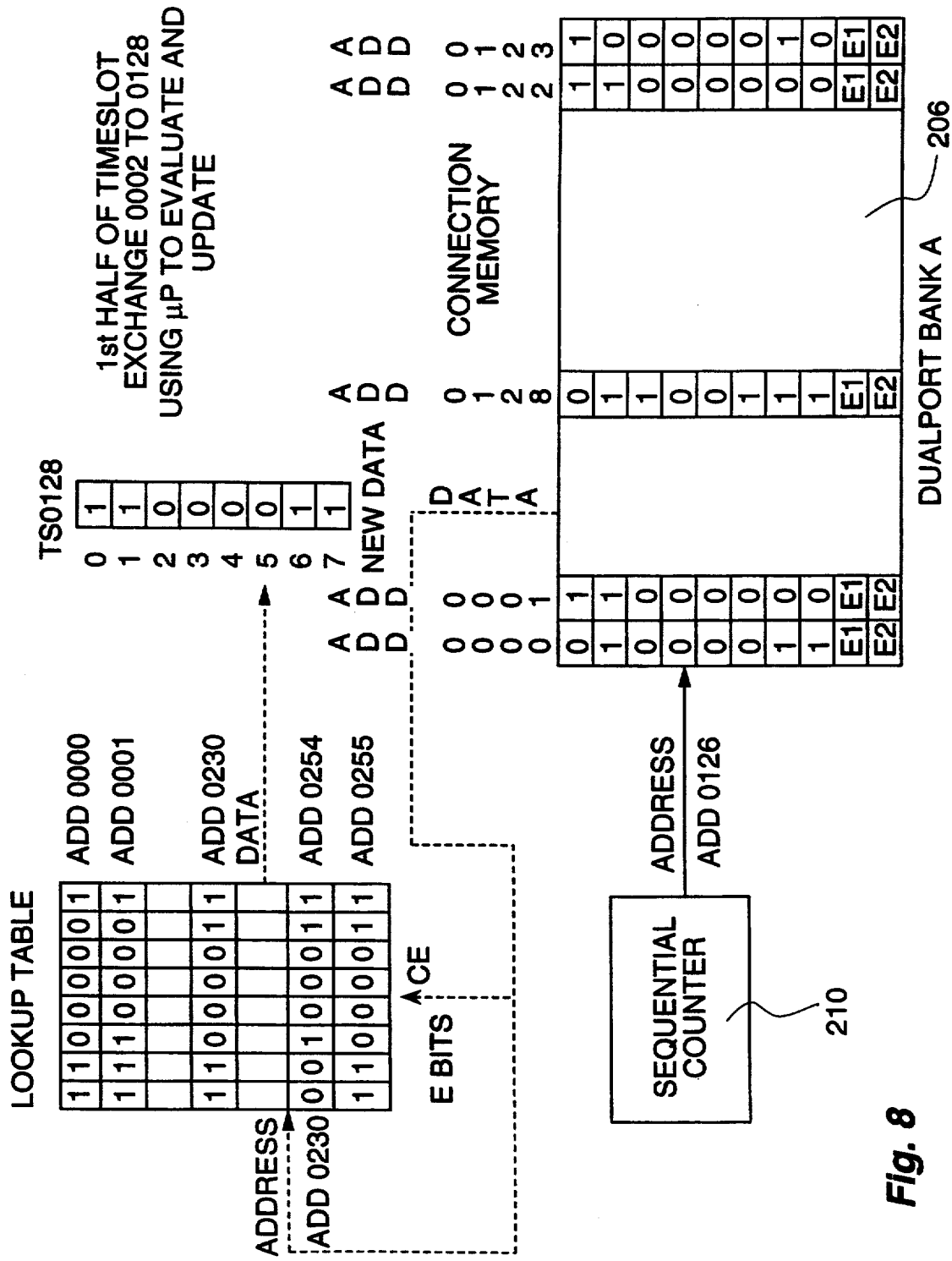
FIG. 8 is a diagram explaining a second half of a time slot exchange.

As seen in FIG. 8, the sequential counter 210 sequentially reads out data from the connection memory 206 which forms an address for the successive time slots. A look-up table 208 (RAM) is then used wherein the data is read from the incoming dual port based on the placement in the connection memory (an address in time). The data then becomes part of the address along with the higher bits from the connection memory for a look-up table with the output data or new data mapped in this selected address location. The new data 206 is then output to a parallel to serial converter wherein the data leaves the look-up tables as an 8 bit wide parallel pack and is converted to serial data and is preferably then multiplexed up to a higher data rate (for example 8 Mb/sec) where it is directed over the bus 32 or bus 132 to a line card (20 or 120).

Processing the data for time slot interchange as noted immediately above provides several advantages. One significant advantage of the interchange with look-up tables is the freeing up of the microprocessor for other operations. As a further advantage, a hardware interrupt circuit can be employed added to the look-up tables to notify the microprocessor when an illegal packet of data has been received by the look-up tables. Since the look-up tables will have the necessary bit packets relating to various signalling data, an error can be immediately detected. Since the upper two bits of the look-up data is not sent to the outgoing address, it can be used to indicate a valid data address. The software can make use of this ability by loading the upper two bits of a valid data address with "ones" and invalid data addresses with "zero" in either position. If the "zero" is loaded into the highest location—a high level interrupt may be triggered. If the "zero" is loaded into the next highest location, a low level interrupt may be triggered. Flexibility can be added to enable and disable the interrupt circuit for each cross connection. The high level interrupt may be masked after an interrupt has occurred to enable recognition of a return to normal interrupt (for example if a line card has been removed and replaced).

While specific embodiments of the invention have been shown and described in detail to illustrate the application of the principles of the invention, it will be understood that the invention may be embodied otherwise without departing from such principles.

What is claimed is:

1. A digital cross connect device for telephone and data transfer systems, comprising:
   a plurality of line cards, including line cards connected to a network line and line cards connected to a subscriber line, said network line and said subscriber line carrying signals including a data portion and a status signal portion;
   separator means for separating said data portion from said status signal portion;
   coder means for coding said status signal portion to provide status signal bit packets based on received status signals from said status signal portion;
   status signal time slot interchange means for receiving said status signal bit packets and transmitting said status signal bit packets, based on assigned time slots, to another line card, said status signal time slot interchange means including a connection memory having address locations corresponding to time slots, and a dual port memory for receiving said status signal bit packets and writing bit packets based on said address locations of said connection memory.

2. A system according to claim 1, wherein:
   said status signal time slot interchange means includes look-up table means mapping incoming data to new data for a selected line card.

3. A system according to claim 1, wherein:
   said status signal time slot interchange means includes a microprocessor for writing signalling data directly to an outgoing address.

4. A system according to claim 1, further comprising:
   multiplexing means for multiplexing signals from said line cards;
   a signal bus connecting said line cards to said status signal time slot interchange means;
   demultiplexing means for demultiplexing signals from said signal bus to form a serial data stream; and
   serial to parallel converting means for converting said serial data stream to parallel data packs.

5. A digital cross connect device for telephone and data transfer systems, comprising:
   a plurality of line cards, including line cards connected to a network line and line cards connected to a subscriber line, said network line and said subscriber line carrying signals including a data portion and a status signal portion;
   separator means for separating said data portion from received status signals from said status signal portion;
   coder means for coding said status signal portion to provide status signal bit packets based on received status signals;
   status signal time slot interchange means for receiving said status signal bit packets and transmitting status signal information to a selected line card, based on assigned time slots, said status signal time slot interchange means including a connection memory having address locations corresponding to time slots, a dual port memory for receiving said status signal bit packets and writing bit packets based on said address locations of said connection memory and look-up table means mapping each of said bit packets to a new data packet for said selected line card for the output of said new data packet based on said mapping.

6. A method for telephone data transfer, for connection between any one of a plurality of line cards, including line cards connected to a network line and line cards connected to a subscriber line, said network line and said subscriber line carrying a signal including a data portion and a status signal portion, comprising the steps of:
   separating said data portion from said status signal portion;
   coding said status signal portion to provide status signal bit packets based on received status signals; and
   transmitting status signal information, based on assigned time slots, to another line card by writing said status signal bit packets to a dual port memory, establishing address locations, corresponding to time slots, in a connection memory, and writing bit packets out of said dual port memory based on said address locations of said connection memory and mapping each of said bit packets to a new data packet for a selected line card for transmitting new data based on said mapping.

* * * * *